US011518444B2

United States Patent
Hayakawa et al.

(10) Patent No.: US 11,518,444 B2
(45) Date of Patent: Dec. 6, 2022

(54) FRONT END STRUCTURE

(71) Applicant: HONDA MOTOR CO., LTD., Tokyo (JP)

(72) Inventors: Kimihito Hayakawa, Wako (JP); Kohki Sugawara, Wako (JP); Shuichi Uchiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 16/884,104

(22) Filed: May 27, 2020

(65) Prior Publication Data

US 2020/0385067 A1 Dec. 10, 2020

(30) Foreign Application Priority Data

Jun. 4, 2019 (JP) ............................. JP2019-104410

(51) Int. Cl.
*B62D 25/08* (2006.01)
*B60K 11/08* (2006.01)

(52) U.S. Cl.
CPC .......... *B62D 25/085* (2013.01); *B60K 11/085* (2013.01); *B62D 25/084* (2013.01)

(58) Field of Classification Search
CPC .... B62D 25/085; B62D 25/084; B60K 11/08; B60K 11/085
See application file for complete search history.

(56) References Cited

U.S. PATENT DOCUMENTS

| 10,155,438 B2 | 12/2018 | Vacca et al. |
| 2005/0279547 A1* | 12/2005 | Udo ..................... B62D 25/084 296/192 |
| 2007/0068716 A1 | 3/2007 | Kunikata |

(Continued)

FOREIGN PATENT DOCUMENTS

| CN | 101239580 | 8/2008 |
| CN | 101437705 | 5/2009 |

(Continued)

OTHER PUBLICATIONS

Chinese Office Action for Chinese Patent Application No. 202010452699.0 dated Apr. 8, 2022.

*Primary Examiner* — Lori L Lyjak
(74) *Attorney, Agent, or Firm* — Amin, Turocy & Watson, LLP (57) ABSTRACT

The present invention provides a front end structure in which cooling performance can be improved. A front end structure according to an aspect of the present invention includes a frame portion 41 that surrounds an outer circumferential part of a heat exchanger and supports the heat exchanger; a duct portion 42 that is connected to an inner circumferential edge of the frame portion 41 and guides outside air, which is taken in through a first introduction port 61, in at least an up-down direction through a space between the duct portion 42 and a front surface of the heat exchanger; and a division portion 43 that is provided in at least one of the frame portion 41 and the duct portion 42 and partitions the heat exchanger into a heat exchange area in which outside air is able to pass through in a front-rear direction and a support area which is positioned on a side circumferentially outward from the heat exchange area and is supported by the frame portion 41.

10 Claims, 9 Drawing Sheets

(56) References Cited

U.S. PATENT DOCUMENTS

| | | | | |
|---|---|---|---|---|
| 2011/0097984 | A1* | 4/2011 | Hasegawa | B60K 11/085 454/152 |
| 2013/0223980 | A1* | 8/2013 | Pastrick | B60K 11/085 415/1 |

FOREIGN PATENT DOCUMENTS

| | | | | |
|---|---|---|---|---|
| CN | 101559787 | | 10/2009 | |
| CN | 102050008 | | 5/2011 | |
| CN | 108928229 | | 12/2018 | |
| EP | 1698520 | A1 * | 9/2006 | ............. B60R 19/12 |
| EP | 2944552 | B1 * | 6/2017 | ............. B60K 11/04 |
| FR | 3013302 | A1 * | 5/2015 | ............. B60K 11/04 |
| JP | 2009-184553 | | 8/2009 | |
| JP | 6460180 | B1 * | 1/2019 | ............. B60K 11/06 |
| KR | 10-2012-0110192 | | 10/2012 | |
| RU | 2678384 | C2 * | 1/2019 | ........... B60K 11/085 |
| WO | 2015/075336 | | 5/2015 | |

* cited by examiner

FRONT END STRUCTURE

CROSS-REFERENCE TO RELATED APPLICATION

Priority is claimed on Japanese Patent Application No. 2019-104410, filed Jun. 4, 2019, the content of which is incorporated herein by reference.

BACKGROUND OF THE INVENTION

Field of the Invention

The present invention relates to a front end structure.

Description of Related Art

A heat exchanger (for example, a radiator) is mounted in a motor compartment or the like defined in a vehicle body front portion. The heat exchanger is supported by a vehicle body with a support member such as a bulkhead therebetween. The heat exchanger performs cooling or the like of a refrigerant flowing inside the heat exchanger by performing heat exchange with outside air taken into the motor compartment. Regarding a configuration in which outside air is introduced into a heat exchanger, the specification of U.S. Pat. No. 10,155,438 discloses a configuration in which a duct for connecting a heat exchanger and a radiator grille to each other is provided.

SUMMARY OF THE INVENTION

However, in the technology in related art described above, a duct is configured to surround a part including a bulkhead. Therefore, there is a possibility that outside air flowing inside the duct may pass through a space between a heat exchanger and the bulkhead. That is, there is concern that outside air may bypass the heat exchanger. Thus, there is still room for improvement in improving cooling performance.

An object of the present invention is to provide a front end structure in which cooling performance can be improved.

Solution to Problem

A front end structure according to the present invention employ the following configurations.

(1) According to an aspect of the present invention, there is provided a front end structure (for example, a front end structure 21 in an embodiment) including a frame portion (for example, a frame portion 41 in the embodiment) that surrounds an outer circumferential part of a heat exchanger (for example, a radiator 91 or a condenser 92 in the embodiment) disposed in the front of a vehicle body (for example, a vehicle body 10 in the embodiment) and supports the heat exchanger; a first duct portion (for example, a duct portion 42 in the embodiment) that is connected to an inner circumferential edge of the frame portion and guides outside air, which is taken in through a first introduction port (for example, a first introduction port 61 in the embodiment) opening at a first end portion in an up-down direction, in at least the up-down direction through a space between the first duct portion and a front surface of the heat exchanger; and a division portion (for example, a division portion 43 in the embodiment) that is provided in at least one of the frame portion and the first duct portion and partitions the heat exchanger into a heat exchange area (for example, a radiator core 101 or a condenser core 121 in the embodiment) in which outside air is able to pass through in a front-rear direction and a support area (for example, a radiator tank 100 or a condenser tank 120 in the embodiment) which is positioned on a side circumferentially outward from the heat exchange area and is supported by the frame portion.

(2) In the front end structure according to the aspect of (1) described above, the frame portion may include a side wall portion (for example, a side wall portion 45*b* in the embodiment) positioned on a lateral side of the heat exchanger, and a vehicle body attachment portion (for example, a vehicle body attachment portion 46 in the embodiment) which extends laterally from the side wall portion and is attached to the vehicle body. The division portion may protrude rearward and extend in a rib shape following the frame portion.

(3) In the front end structure according to the aspect of (2) described above, a bumper beam extension (for example, a bumper beam extension 24 in the embodiment) connected to the vehicle body attachment portion may be provided on a lateral side of the side wall portion. A recessed portion (for example, a recessed portion 58 in the embodiment) through which a portion of the bumper beam extension passes in the front-rear direction may be formed in a part of the side wall portion facing the bumper beam extension in a vehicle width direction.

(4) In the front end structure according to the aspect of (2) or (3) described above, a support rib (for example, a support rib 50 in the embodiment) may be formed at an outer circumferential edge of the vehicle body attachment portion.

(5) In the front end structure according to the aspect of any one of (1) or (4) described above, the heat exchanger may be at least any of a condenser and a radiator. The frame portion may come into contact with the heat exchanger with a seal member (for example, a seal member 112 in the embodiment) therebetween on the side circumferentially outward from the division portion.

(6) The front end structure according to the aspect of any one of (1) or (5) described above may further include a shutter (for example, a shutter 34 in the embodiment) that is disposed in front of the first introduction port with a gap therebetween and is configured to open and close the first introduction port. The shutter may be configured to be deformable in a manner of being bent rearward due to a pressure of outside air at a closed position.

(7) In the front end structure according to the aspect of (6) described above, a second introduction port (for example, a second introduction port 62 in the embodiment) for taking outside air into the first duct portion may be formed in the first duct portion at a position not overlapping the shutter in a front view.

(8) In the front end structure according to the aspect of (7) described above, a second duct portion (for example, a bumper duct 33 in the embodiment) for guiding outside air into the first introduction port and the second introduction port may be disposed in front of the first duct portion. A part of the first duct portion joined to the second duct portion may be formed to have a thicker wall than other parts.

(9) In the front end structure according to the aspect of (8) described above, the frame portion may include a lateral wall (for example, a lateral wall 51 in the embodiment) which is positioned below the heat exchanger, a vertical wall (for example, a vertical wall 52 in the embodiment) which extends upward from a front end portion of the lateral wall and supports the shutter from below, and a reinforcement rib (for example, a reinforcement rib 57 in the embodiment) which protrudes downward from the lateral wall. A protruding amount of the reinforcement rib from the lateral wall may increase from the front toward the rear.

(10) In the front end structure according to the aspect of any one of (1) or (9) described above, a bulging portion (for example, a bulging portion 55 in the embodiment) which bulges beyond other parts and accommodates a fixing portion (for example, a radiator bracket 110 in the embodiment) of the heat exchanger provided in the support area may be formed in a portion of the outer circumferential part in the frame portion. The fixing portion may be fixed to the bulging portion in the front-rear direction.

(11) In the front end structure according to the aspect of any one of (1) or (10) described above, the first duct portion may include an expanded portion (for example, a straight portion 78 in the embodiment) which overlaps the center of the heat exchange area in a front view, and reduced portions (for example, a lower tapered portion 76 and an upper tapered portion 77 in the embodiment) which are positioned above and below the expanded portion and of which a cross-sectional area of a flow channel orthogonal to the up-down direction is smaller than a cross-sectional area of the expanded portion.

Advantageous Effects of Invention

According to the aspect of (1) described above, outside air flowing along the front surface of the heat exchanger is blocked by the division portion. Therefore, outside air bypassing the support area of the heat exchanger can be curbed. That is, outside air can actively pass through the heat exchange area of the heat exchanger. Therefore, cooling performance can be improved.

Further, in this aspect, the inside and the outside of the first duct portion communicate with each other through the first introduction port formed at the first end portion in the up-down direction. Therefore, an opening portion (for example, a grille) on the front surface of the vehicle body can be reduced in size. As a result, air resistance can be reduced, and the appearance can be improved. Particularly, for example, in a case of an electrically driven vehicle, a required cooling capacity is smaller than that of a vehicle in which an internal combustion engine is mounted. For this reason, a cooling performance efficiency of the front end structure can be enhanced, and size reduction can be achieved.

According to the aspect of (2) described above, rigidity for the frame portion and the first duct portion can be secured due to the division portion. In addition, the flow of outside air can be restricted over a wide range due to the division portion. Therefore, outside air can be actively guided to the heat exchange area.

Moreover, the frame portion is attached to the vehicle body with the vehicle body attachment portion extending laterally from the side wall portion therebetween. For this reason, a margin for attachment between the vehicle body and the frame portion can be easily secured, and a support strength can also be secured.

According to the aspect of (3) described above, the recessed portion is formed in only a portion of the side wall portion of the frame portion. Therefore, for example, even in a vehicle type or the like having a narrow width in the vehicle width direction, it is possible to dispose as large a frame portion as possible. Accordingly, the heat exchanger accommodated on the inward side of the frame portion can be increased in size.

According to the aspect of (4) described above, rigidity for the vehicle body attachment portion can be secured, and a support strength can be secured.

According to the aspect of (5) described above, even if outside air passes through the division portion, outside air bypassing the heat exchanger can be curbed.

According to the aspect of (6) described above, the amount of outside air flowing into the first duct portion can be adjusted by adjusting the opening degree of the shutter. Accordingly, cooling performance of the heat exchanger can be adjusted. Further, in this aspect, the shutter is configured to be deformable in a manner of being bent due to a pressure of outside air at the closed position. For this reason, for example, when a vehicle travels while the shutter is at the closed position, the shutter is close to or abuts an opening edge of the first introduction port. Accordingly, a gap between the shutter and the first introduction port can be sealed with a simple configuration. In this case, it is possible to curb so-called recirculation in which warm air on a downstream side (second end portion side in the up-down direction) flows backward to an upstream side (first end portion in the up-down direction). In addition, there is no need to separately provide a seal member for sealing a gap between the shutter and the opening edge of the first introduction port. Therefore, the number of components can be reduced. Moreover, compared to a configuration in which the shutter and the opening edge of the first introduction port are brought into tight contact with each other, uneven assembly accuracy can be allowed. For example, it is possible to curb interference between the shutter and the first duct portion hindering assembly of the shutter, or the like.

According to the aspect of (7) described above, even when the size of the shutter or the first introduction port is limited due to the influence of surrounding members (for example, a bumper beam) of the shutter, outside air can be taken into the first duct portion through the second introduction port.

According to the aspect of (8) described above, an attachment strength of the second duct portion can be secured, and the front end structure can be reduced in weight.

According to the aspect of (9) described above, rigidity for the lateral wall can be secured due to the reinforcement rib. Therefore, the volume of the frame portion on the inward side can be secured, and an accommodation member (for example, a heat exchanger) accommodated on the inward side of the frame portion can be stably supported by the lateral wall. Particularly, the protruding amount of the reinforcement rib increases at a rear end portion of the lateral wall in which a bending moment is likely to increase. Therefore, rigidity necessary for the lateral wall is easily secured.

On the other hand, a connection member (for example, a shutter) connected to the front of the first duct portion is supported by the vertical wall. Therefore, a small protruding amount of the reinforcement rib at the front end portion of the lateral wall can be maintained.

In this manner, rigidity for the frame portion can be secured, and a bulkhead can be reduced in weight by adjusting the protruding amount of the reinforcement rib in accordance with a necessary place.

According to the aspect of (10) described above, only a portion of the frame portion is caused to bulge. Therefore, reduction in size or weight of the front end structure can be achieved, and the heat exchanger can be settled on the inward side of the frame portion.

According to the aspect of (11) described above, a cross-sectional area of a flow channel formed between the first duct portion and the heat exchanger increases during a course from the reduced portions to the expanded portion. Therefore, compared to when the cross-sectional area of the flow channel is uniformly formed, vortices easily occur in outside air. Accordingly, a vector of a flow of outside air toward the second end portion side in the up-down direction is reduced, and thus outside air easily flows toward the heat exchange area.

On the other hand, the cross-sectional area of the flow channel is reduced during a course from the expanded portion to the reduced portions. Therefore, compared to when the cross-sectional area of the flow channel is uniformly formed, it is difficult for outside air to flow to the second end portion side in the up-down direction. Accordingly, outside air easily flows to the heat exchange area.

As a result, the cooling performance can be improved.

DETAILED DESCRIPTION OF THE INVENTION

Hereinafter, an embodiment of the present invention will be described based on the drawings.

Figure 1:
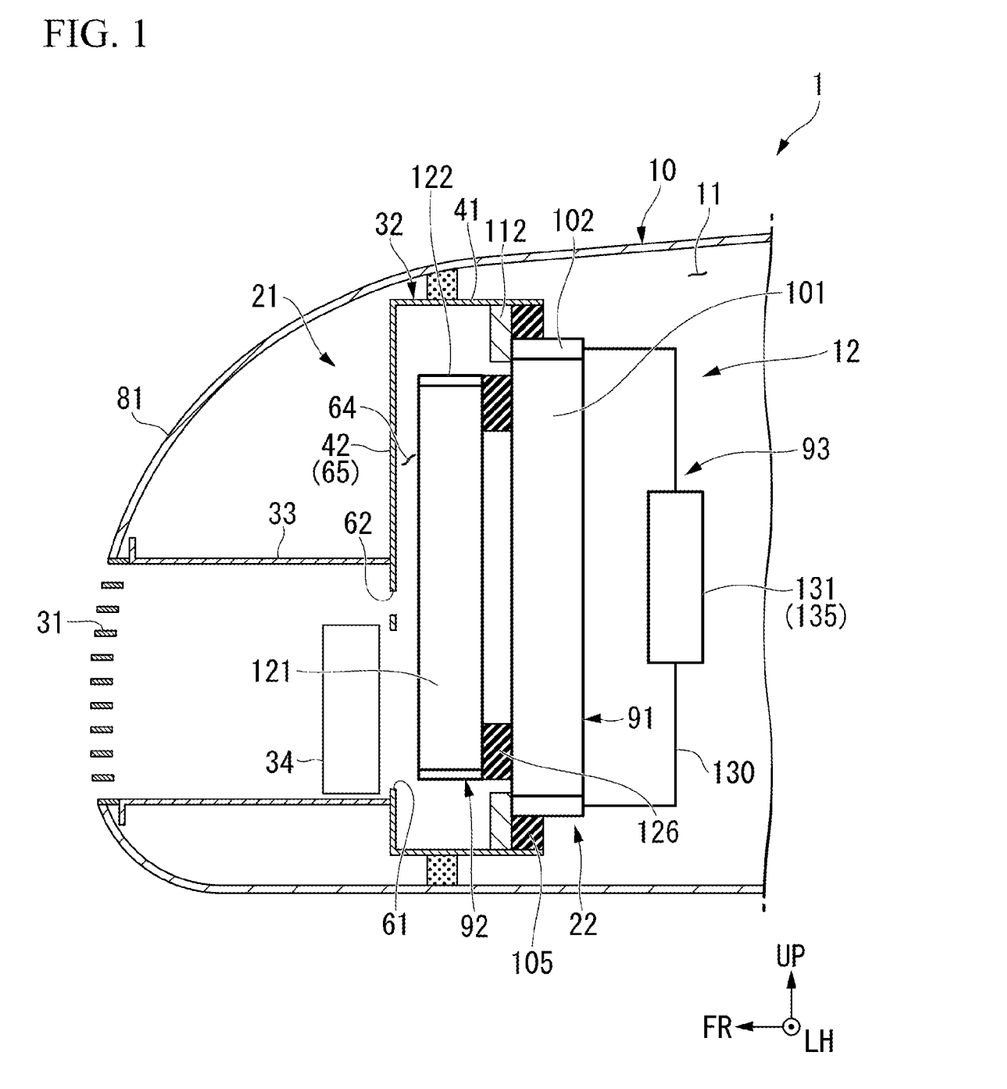
FIG. 1 is a schematic side view showing a front portion of a vehicle according to an embodiment.

FIG. 1 is a schematic view showing a front portion of a vehicle 1. In the drawings used below, the arrow FR indicates the front of the vehicle 1, the arrow UP indicates a side above the vehicle 1, and the arrow LH indicates the left side of the vehicle 1.

For example, the vehicle 1 shown in FIG. 1 is an electrically driven vehicle such as a hybrid automobile or an electric automobile. The vehicle 1 has a vehicle body front portion structure 12 in which a motor compartment 11 and the like are formed in the front portion of a vehicle body 10. The motor compartment 11 is partitioned from the inside of a vehicle cabin by a dashboard.

Vehicle Body Front Portion Structure

The vehicle body front portion structure 12 includes a skeleton member (refer to FIG. 2) 20, a front end structure 21, and a heat exchange unit 22.

Skeleton Member

Figure 2:
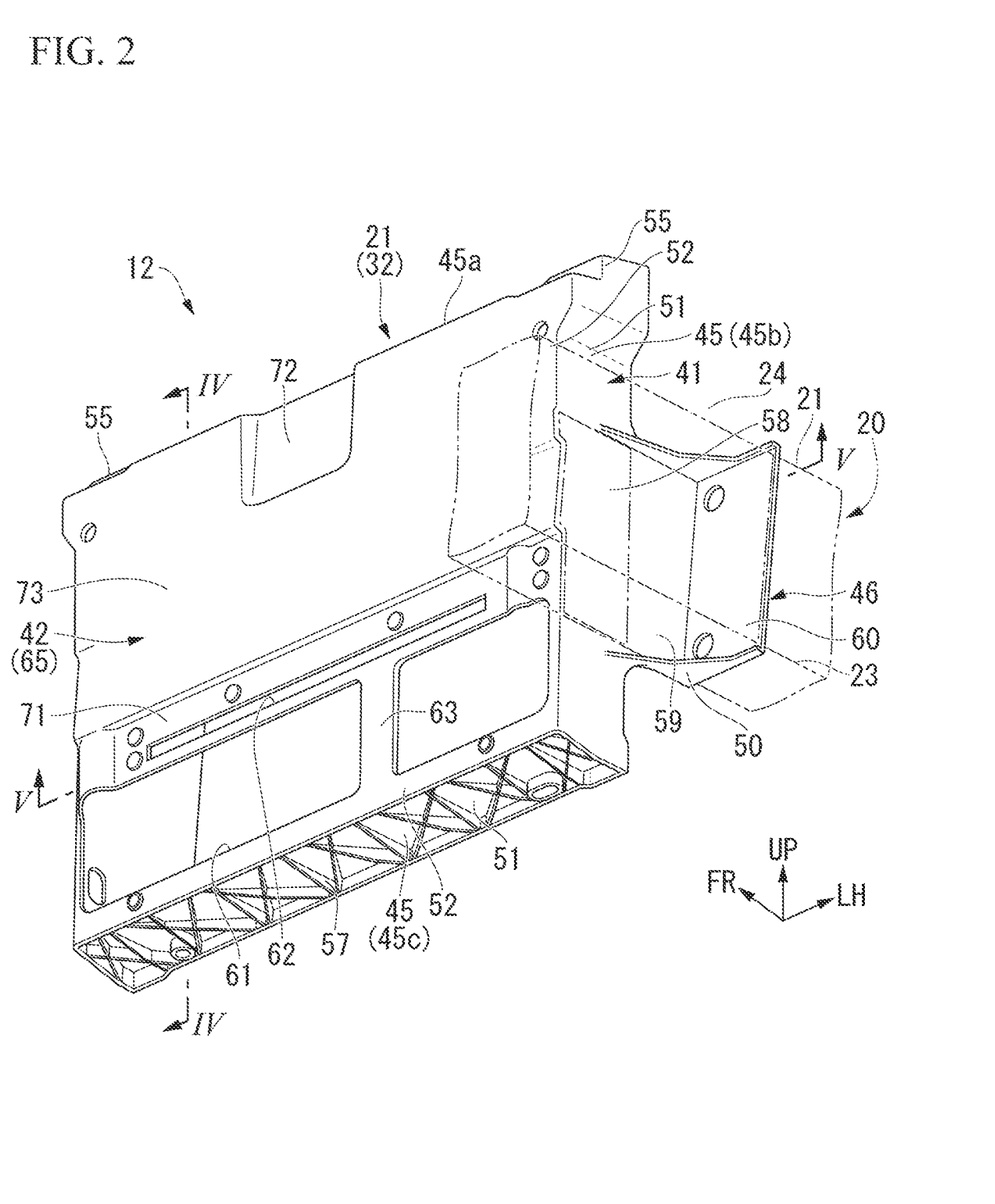
FIG. 2 is a perspective view of a vehicle body front portion structure according to the embodiment viewed from the front.
Figure 3:
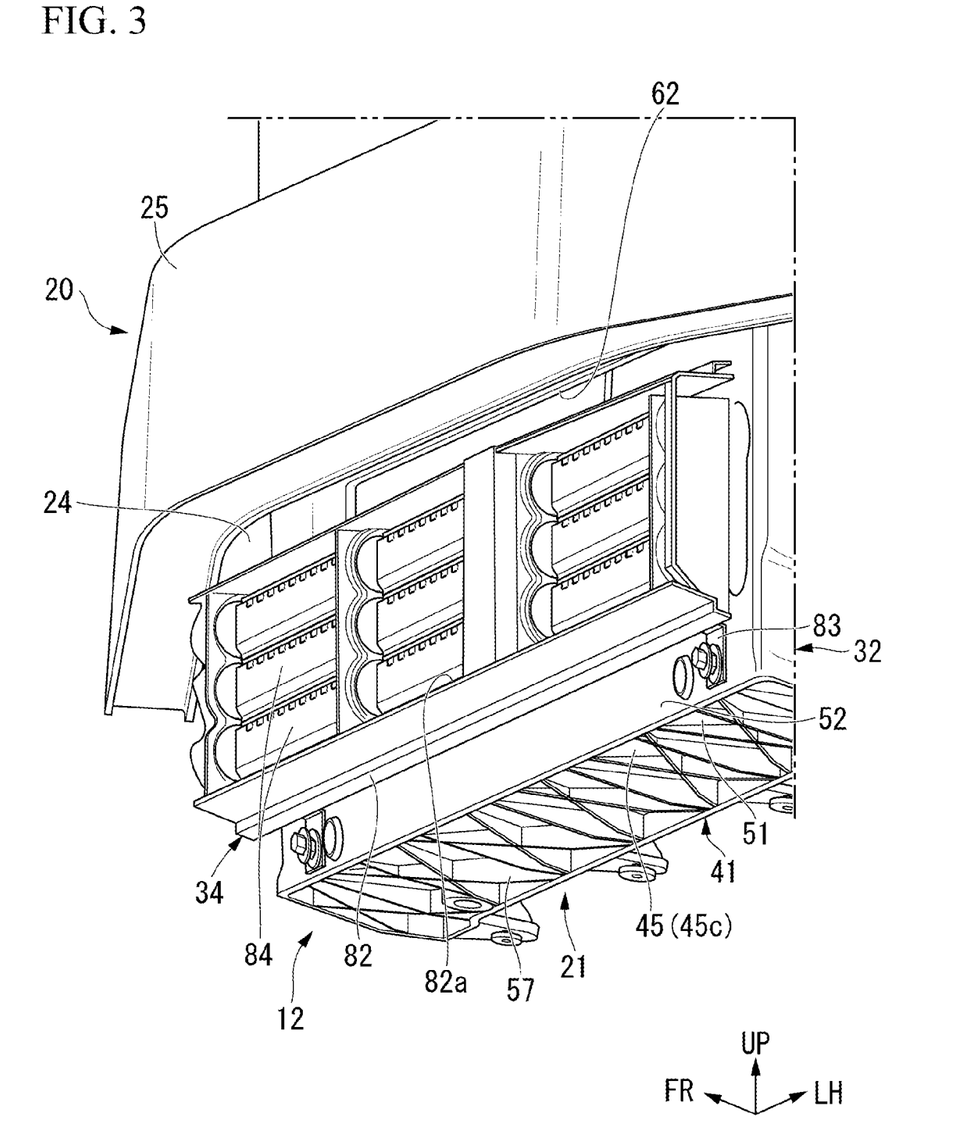
FIG. 3 is another perspective view of the vehicle body front portion structure according to the embodiment viewed from the front.

FIGS. 2 and 3 are perspective views of the vehicle body front portion structure 12 viewed from the front.

As shown in FIGS. 2 and 3, the skeleton member 20 includes front side frames 23, a bumper beam extension 24, and a bumper beam 25 (refer to FIG. 3).

The front side frames 23 are arranged on both sides of a lower portion of the motor compartment 11. The front side frames 23 are formed to have a rectangular shape in a cross-sectional view in a left-right direction and extend in a front-rear direction. Rear end portions of both the side frames 23 are connected to a frame member (not shown) such as a floor frame or a side sill.

In addition, a front sub-frame (not shown) is provided below the front side frames 23. The front sub-frame is formed to have a parallel-cross shape (frame shape) in a plan view. The front sub-frame is disposed such that the motor compartment 11 is covered from below. For example, both end portions of the front sub-frame in the left-right direction are joined to the corresponding front side frames 23. The front sub-frame supports a power plant such as a motor unit with a mount member or the like therebetween.

The bumper beam extension 24 is connected to front end portions of the front side frames 23 with a bulkhead 32 (which will be described below) therebetween. The bumper beam extension 24 is a member having a closed cross-sectional structure with a rectangular shape in a cross-sectional view. The bumper beam extension 24 is configured to be able to perform compressive deformation (buckling deformation) in the front-rear direction when an impact load is input.

Front End Structure

As shown in FIG. 1, the front end structure 21 is disposed in front of the heat exchange unit 22 inside the motor compartment 11. The front end structure 21 supports the heat exchange unit 22 and guides outside air taken into the motor compartment 11 through a grille 31 (refer to FIG. 1) to the heat exchange unit 22. The front end structure 21 includes the bulkhead 32, a bumper duct 33, and a shutter 34.

As shown in FIG. 2, the bulkhead 32 has a rectangular shape in a front view and is formed in a box shape which opens rearward. The bulkhead 32 covers the heat exchange unit 22 from the front. In the present embodiment, the bulkhead 32 is integrally formed of a resin material or the like. For example, the bulkhead 32 is formed through injection molding using a polypropylene resin including reinforcing fibers (for example, glass fibers). However, when a necessary strength of the bulkhead 32 is low, reinforcing fibers do not have to be included. On the other hand, when the necessary strength of the bulkhead 32 is high, the bulkhead 32 may be formed through heating pressing in a state in which a resin sheet including discontinuous fibers (long fibers or short fibers) overlaps a resin sheet including continuous fibers.

Figure 4:
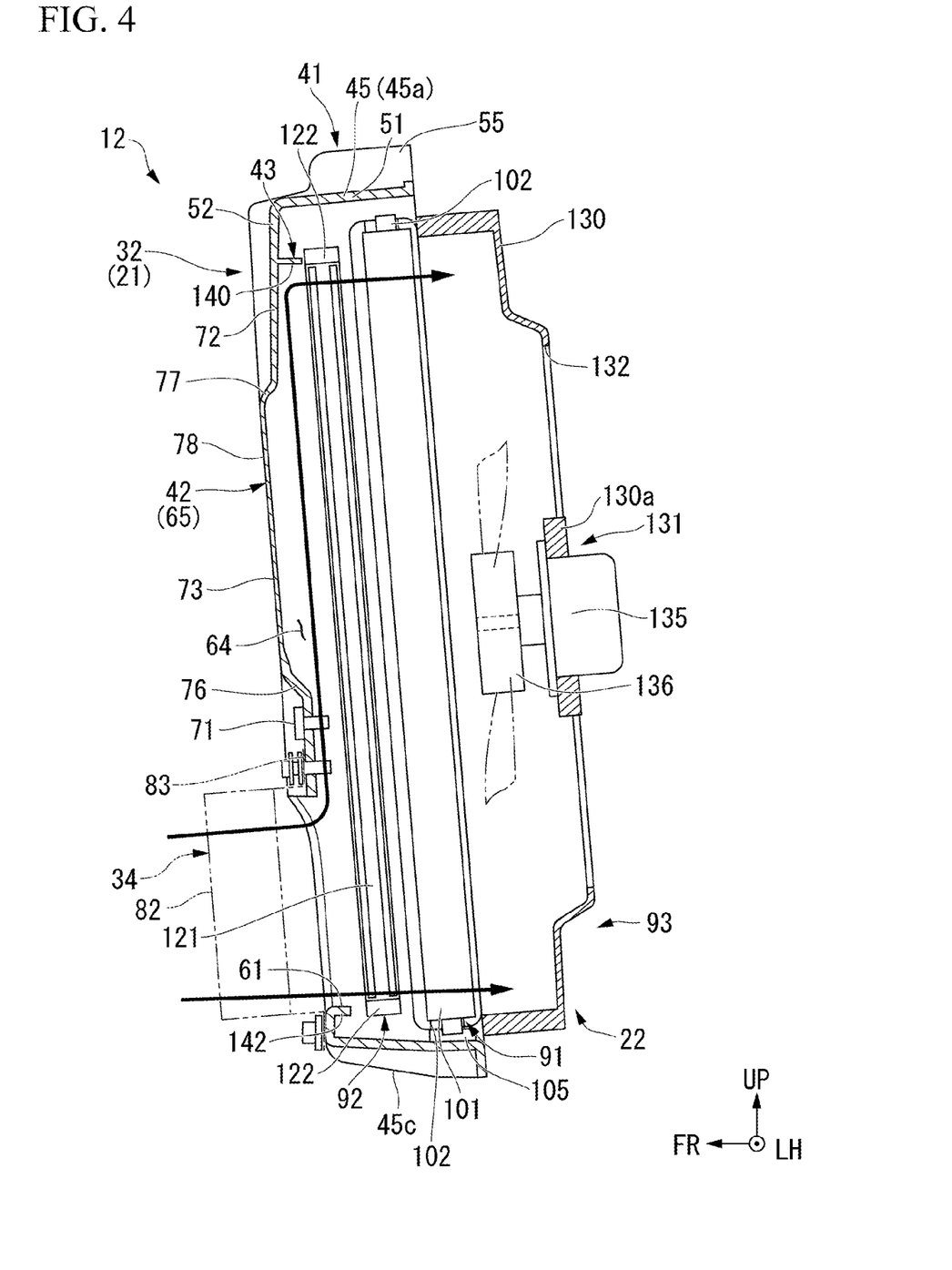
FIG. 4 is a cross-sectional view along line IV-IV in FIG. 2.
Figure 5:
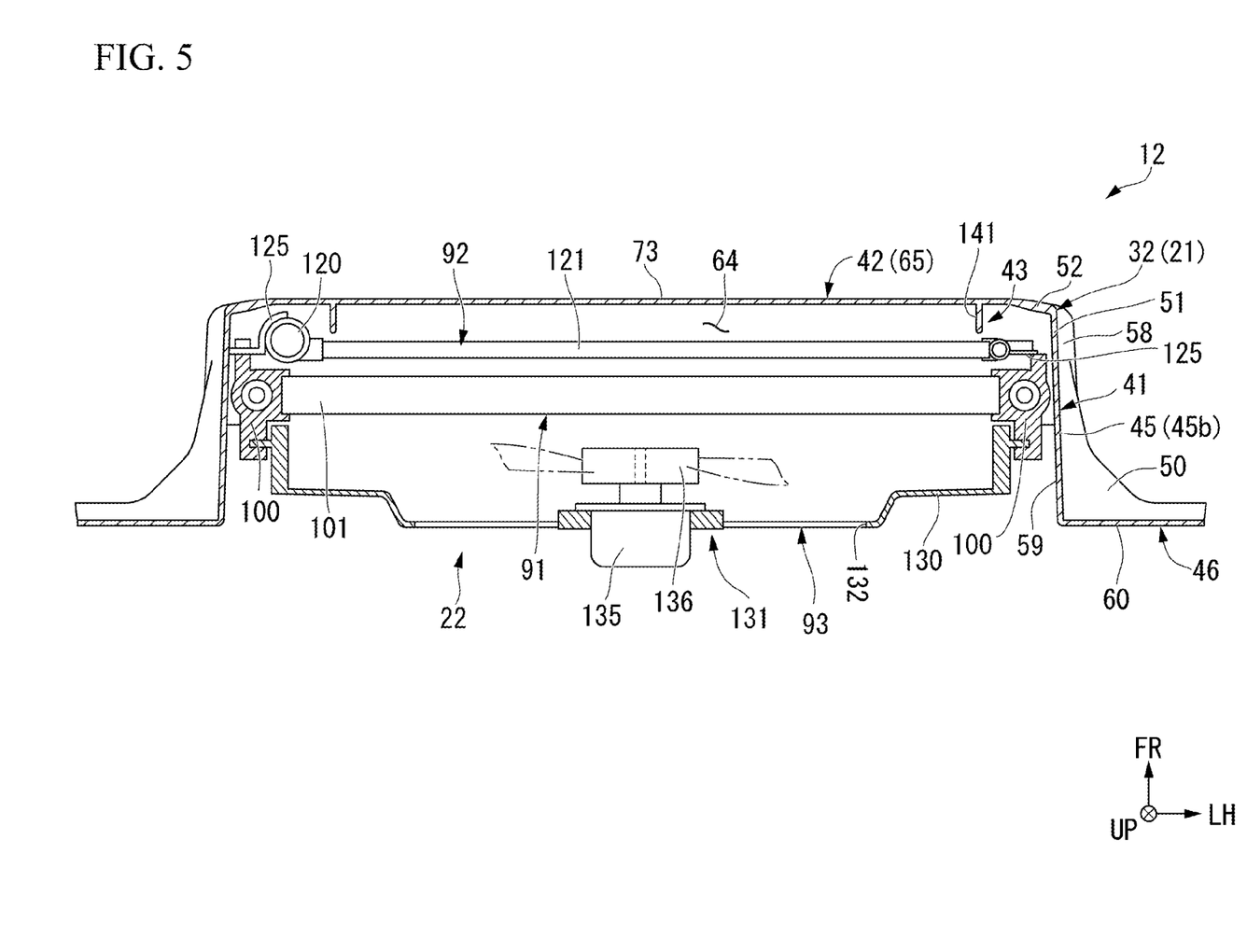
FIG. 5 is a cross-sectional view along line V-V in FIG. 2.

FIG. 4 is a cross-sectional view along line IV-IV in FIG. 2. FIG. 5 is a cross-sectional view along line V-V in FIG. 2.

As shown in FIGS. 4 and 5, the bulkhead 32 includes a frame portion 41, a duct portion 42, and a division portion 43.

As shown in FIGS. 2 and 5, the frame portion 41 includes a frame portion main body 45 and a vehicle body attachment portion 46.

The frame portion main body 45 is a picture frame-like part constituting the outer circumference of the bulkhead 32. The frame portion main body 45 is formed to have an L-shape in a cross-sectional view. Specifically, the frame portion main body 45 includes a lateral wall 51 which lies in the front-rear direction and a vertical wall 52 which is bent inward from the front end portion of the lateral wall 51.

As shown in FIG. 2, bulging portions 55 are formed at the rear end portion in corner portions on both sides of an upper portion of the frame portion main body 45 (bulkhead 32). The bulging portions 55 bulge upward with respect to an upper wall portion 45a and bulge outward in the left-right direction with respect to a side wall portion 45b of the frame portion main body 45, respectively.

As shown in FIG. 3, a reinforcement rib 57 is formed in a lower wall portion 45c of the frame portion main body 45 (bulkhead 32). The reinforcement rib 57 protrudes downward from the lateral wall 51 part in the lower wall portion 45c. For example, the reinforcement rib 57 is formed to have a lattice shape, a linear shape, or the like. In the present embodiment, a bulging amount of the reinforcement rib 57 from the lateral wall 51 increases from the front toward the rear. However, the shape, the height, and the like of the reinforcement rib 57 can be suitably changed.

As shown in FIGS. 2 and 5, a recessed portion 58 recessed inward in the left-right direction is formed at a central part of the side wall portion 45b in an up-down direction. The recessed portion 58 is a part formed to have a thinner wall than both end portions of the side wall portion 45b in the up-down direction and is formed over the entire side wall portion 45b in the front-rear direction. A portion of the bumper beam extension 24 described above is accommodated inside the recessed portion 58. The bumper beam extension 24 passes through the recessed portion 58 in the front-rear direction.

The vehicle body attachment portion 46 is connected to the side wall portion 45b (lateral wall 52 part) at a position corresponding to the recessed portion 58 in the up-down direction. The vehicle body attachment portion 46 is formed to have an L-shape in a plan view. The vehicle body attachment portion 46 includes a rearward extending portion 59 which extends rearward from the side wall portion 45b and a flange portion 60 which is bent outward in the left-right direction from the rearward extending portion 59.

The flange portion 60 is sandwiched between the front end portions of the front side frames 23 and the rear end portion of the bumper beam extension 24 in the front-rear direction. That is, the front side frames 23 and the bumper beam extension 24 are connected to each other with the flange portion 60 therebetween. The upper wall portion 45a and the lower wall portion 45c of the lateral wall 51 part are suitably fixed to the skeleton member 20 as well.

In the present embodiment, support ribs 50 are provided at outer circumferential edges (upper and lower end edges) of the vehicle body attachment portion 46. The support ribs 50 are formed over parts from the flange portion 60 to the upper and lower end edges of the recessed portion 58 through the rearward extending portion 59. In the present embodiment, protruding amounts of the support ribs 50 increase toward a boundary part of the flange portion 60 and the rearward extending portion 59.

As shown in FIG. 2, the duct portion 42 is connected to an inner circumferential edge of the frame portion 41 and constitutes a front wall portion of the bulkhead 32 together with the vertical wall 52 part. The upper portion of the duct portion 42 is covered by the bumper beam 25 (refer to FIG. 3) described above from the front. A first introduction port 61 and a second introduction port 62 are formed in a lower portion (part positioned below the center) of the duct portion 42. Each of the introduction ports 61 and 62 penetrates the duct portion 42 in the front-rear direction such that the inside and the outside of the bulkhead 32 communicate with each other.

The first introduction port 61 is a penetration hole having a rectangular shape extending in the left-right direction at a lower end portion of the duct portion 42. In the present embodiment, the first introduction port 61 is divided in the left-right direction by a dividing portion 63.

The second introduction port 62 is positioned above the first introduction port 61 in the duct portion 42. The second introduction port 62 is formed to have a thin and long shape having a narrower width in the up-down direction than the first introduction port 61 and having a short length in the left-right direction. However, the shapes and the like of the introduction ports 61 and 62 can be suitably changed. In addition, one introduction port may be adopted.

As shown in FIG. 4, a part of the duct portion 42 positioned above the second introduction port 62 constitutes a flow channel wall 65. The flow channel wall 65 defines a flow channel 64 between the flow channel wall 65 and a condenser 92 (which will be described below) of the heat exchange unit 22. That is, the flow channel wall 65 causes outside air taken into the bulkhead 32 through the introduction ports 61 and 62 to circulate upward along a front surface of the condenser 92 and in the left-right direction. In a longitudinal sectional view in the up-down direction, the flow channel wall 65 includes a lower flow channel wall 71, an upper flow channel wall 72, and a central flow channel wall 73 which is positioned between the lower flow channel wall 71 and the upper flow channel wall 72.

The lower flow channel wall 71 extends in a manner of being inclined forward as it goes upward. That is, a cross-sectional area (cross-sectional area orthogonal to the up-down direction) of the flow channel 64 expands as it is separated upward from the introduction ports 61 and 62.

The upper flow channel wall 72 extends in a manner of being inclined rearward as it goes upward. That is, a cross-sectional area (cross-sectional area orthogonal to the up-down direction) of the flow channel 64 is reduced as it goes upward. However, the lower flow channel wall 71 and the upper flow channel wall 72 may extend in a manner of being parallel to the up-down direction.

The central flow channel wall 73 includes tapered portions (a lower tapered portion (reduced portion) 76 and an upper tapered portion (reduced portion) 77) which are positioned at both upper and lower end portions and a straight portion (expanded portion) 78 which is positioned between the tapered portions 76 and 77.

The lower tapered portion 76 extends forward as it goes upward from an upper end edge of the lower flow channel wall 71. The angle (angle with respect to the up-down direction) of the lower tapered portion 76 is larger than that of the lower flow channel wall 71.

The upper tapered portion 77 extends forward as it goes downward from a lower end edge of the upper flow channel wall 72. The angle (angle with respect to the up-down direction) of the upper tapered portion 77 is larger than that of the upper flow channel wall 72.

The straight portion 78 connects the upper end edge of the lower tapered portion 76 and the lower end edge of the upper tapered portion 77 to each other. In the flow channel 64 of the present embodiment, a cross-sectional area of a flow channel becomes the largest in the straight portion 78.

As shown in FIG. 1, the bumper duct 33 connects the first introduction port 61 and the grille 31 to each other. The bumper duct 33 is formed to have a square tube shape entirely surrounding the first introduction port 61 and the second introduction port 62. The rear end portion of the bumper duct 33 is fixed to a part of the duct portion 42 positioned around the introduction ports 61 and 62. In the present embodiment, as shown in FIG. 4, the wall thicknesses of parts of the duct portion 42 around the introduction ports 61 and 62 to which the rear end portion of the bumper duct 33 is attached are thicker than the wall thicknesses of other parts. Specifically, the wall thicknesses of parts around the introduction ports 61 and 62 are equivalent to the wall thickness of the frame portion 41.

On the other hand, the front end portion of the bumper duct 33 is connected to an exterior portion (for example, a bumper face 81 and the grille 31) of the vehicle body 10. In the present embodiment, a front end opening portion of the bumper duct 33 opens forward through the grille 31.

The shutter 34 is arranged at a part of the rear end portion of the bumper duct 33 overlapping the first introduction port 61 in a front view. That is, the shutter 34 and the second introduction port 62 are arranged such that they do not overlap each other in a front view. The shutter 34 switches between allowing and blocking of communication between the inside of the bumper duct 33 and the inside of the bulkhead 32 through the first introduction port 61. As shown in FIG. 3, the shutter 34 includes a shutter frame 82, attachment pieces 83, and flaps 84.

The shutter frame 82 is formed to have a frame shape of which the external shape in a front view has a size equivalent to that of the first introduction port 61. The inward side of the shutter frame 82 constitutes ventilation ports 82a. For example, a plurality of ventilation ports 82a are formed side by side in the left-right direction.

The attachment pieces 83 connect the shutter frame 82 and the duct portion 42 to each other. For example, a plurality of attachment pieces 83 are provided in the upper frame portion and the lower frame portion of the shutter frame 82 at intervals in the left-right direction. The attachment pieces 83 protrude rearward from the upper frame portion and the lower frame portion. The attachment pieces 83 are fastened to parts (the vertical wall 52 part of the lower wall portion 45c or the duct portion 42) of the duct portion 42 positioned around the first introduction port 61 using bolts or the like. Accordingly, the shutter 34 is fixed to the bulkhead 32 in a state of having a clearance in the front-rear direction between a rear end edge of the shutter frame 82 and a front surface of the duct portion 42 (refer to FIG. 1). The shutter frame 82 of the present embodiment is configured to be deformable in a manner of being bent in the front-rear direction having the attachment pieces 83 as starting points inside a clearance between the shutter frame 82 and the duct portion 42.

As shown in FIG. 3, the flaps 84 are configured to be able to open and close the ventilation ports 82a. The flaps 84 are supported by the shutter frame 82 such that they can turn around an axis in the left-right direction. In the shutter 34, when turning positions of the flaps 84 are adjusted, the opening degrees of the ventilation ports 82a are adjusted. In this case, the flaps 84 close the ventilation ports 82a at fully closed positions. In the shutter 34 of the present embodiment, a plurality of flaps 84 are disposed side by side in the up-down direction with respect to one ventilation port 82a. The front end structure 21 does not have to have the shutter 34.

Heat Exchange Unit

As shown in FIG. 1, the heat exchange unit 22 includes a radiator (heat exchanger) 91, a condenser (heat exchanger) 92, and a fan 93.

The radiator 91 is an element for cooling a motor which is a power source of the vehicle 1, a power control unit (PCU), and the like. As shown in FIGS. 1 and 5, for example, the radiator includes radiator tanks (support areas) 100 which are positioned on both sides on the left and the right, a radiator core (heat exchange area) 101 which is bridged across the radiator tanks 100, and frame members (support areas) 102 which are bridged across the radiator tanks 100 on both sides above and below the radiator core 101.

A refrigerant piping is connected to each of the radiator tanks 100. The refrigerant piping is connected to the motor, the PCU, and the like described above via a pump.

The radiator core 101 includes heat exchange tubes which connect the radiator tanks 100 to each other in a parallel manner and fins which connect adjacent heat exchange tubes to each other. The radiator 91 cools a refrigerant by performing heat exchange between the heat exchange tubes or the fins when outside air passes between adjacent heat exchange tubes. That is, the radiator core 101 constitutes a heat exchange area in the radiator 91.

The radiator 91 of the present embodiment is disposed on the inward side of the bulkhead 32. As shown in FIG. 4, lower end portions of the radiator tanks 100 are supported by the lateral wall 51 part of the lower wall portion 45c with elastically deformable lower radiator mounts 105 therebetween.

Figure 6:
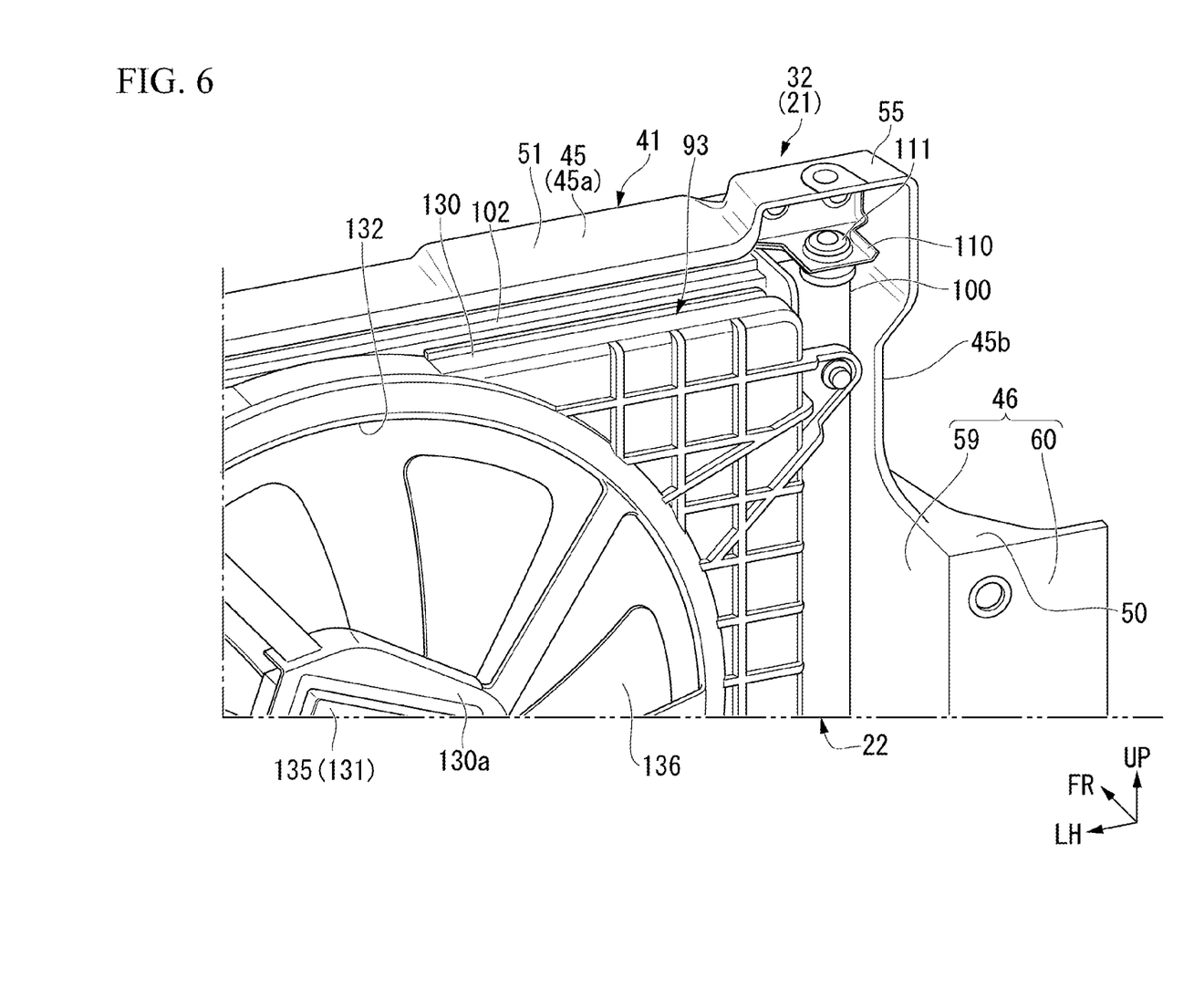
FIG. 6 is a perspective view of a heat exchange unit according to the embodiment viewed from behind.

FIG. 6 is a perspective view of the heat exchange unit 22 viewed from behind.

As shown in FIG. 6, upper end portions of the radiator tanks 100 are attached to the frame portion 41 with radiator brackets (fixing portions) 110 therebetween. The radiator brackets 110 are formed to have an L-shape in a side view. The radiator brackets 110 are accommodated in the bulging portions 55. The rear end portions of the radiator brackets 110 are attached to the upper end portions of the radiator tanks 100 with elastically deformable upper radiator mounts 111 therebetween. The front end portions of the radiator brackets 110 are fixed to front wall parts of the bulging portions 55 in the front-rear direction using bolts or the like. The frame portion 41 may be configured to have the radiator brackets 110 fixed to the bulging portions 55 in the up-down direction or may be configured to have no bulging portion 55.

As shown in FIG. 1, parts (radiator tanks 100 and the frame members 102) of the radiator 91 positioned on the outward side of the radiator core 101 come into tight contact with the frame portion 41 with seal member 112 therebetween.

The condenser 92 constitutes a refrigerating cycle of an air-conditioning device together with a compressor, an evaporator, or the like (none is shown). The condenser 92 is disposed in front of the radiator 91 on the inward side of the bulkhead 32. The condenser 92 has an external shape in a front view smaller than the radiator 91. As shown in FIGS. 1 and 5, for example, the condenser 92 includes condenser tanks (support areas) 120 which are positioned on both sides on the left and the right, a condenser core (heat exchange area) 121 which is bridged across the condenser tanks 120, and frame members (support areas) 122 which are bridged across the condenser tanks 120 on both sides above and below the condenser core 121.

As shown in FIG. 5, the condenser tanks 120 are joined to the corresponding radiator tanks 100 with condenser brackets 125 therebetween. As shown in FIG. 1, the condenser tanks 120 are supported by the condenser brackets 125 with elastically deformable condenser mounts 126 therebetween.

The condenser core 121 includes heat exchange tubes which connect the condenser tanks 120 to each other in a parallel manner and fins which connect adjacent heat exchange tubes to each other. The condenser 92 cools a refrigerant by performing heat exchange between the heat exchange tubes or the fins when outside air passes between adjacent heat exchange tubes. That is, the condenser core 121 constitutes a heat exchange area in the condenser 92.

As shown in FIGS. 4 to 6, the fan 93 includes a shroud 130 and a fan motor 131.

The shroud 130 covers the radiator core 101 from behind. An air guiding hole 132 penetrating the shroud 130 in the front-rear direction is formed in the shroud 130.

The fan motor 131 is provided on the inward side of the air guiding hole 132. Specifically, the fan motor 131 includes a motor 135 and a fan main body 136. The motor 135 is supported by a hub portion 130a (refer to FIG. 6) which is provided on the inward side of the air guiding hole 132. The fan main body 136 is fixed to an output shaft of the motor 135.

Figure 7:
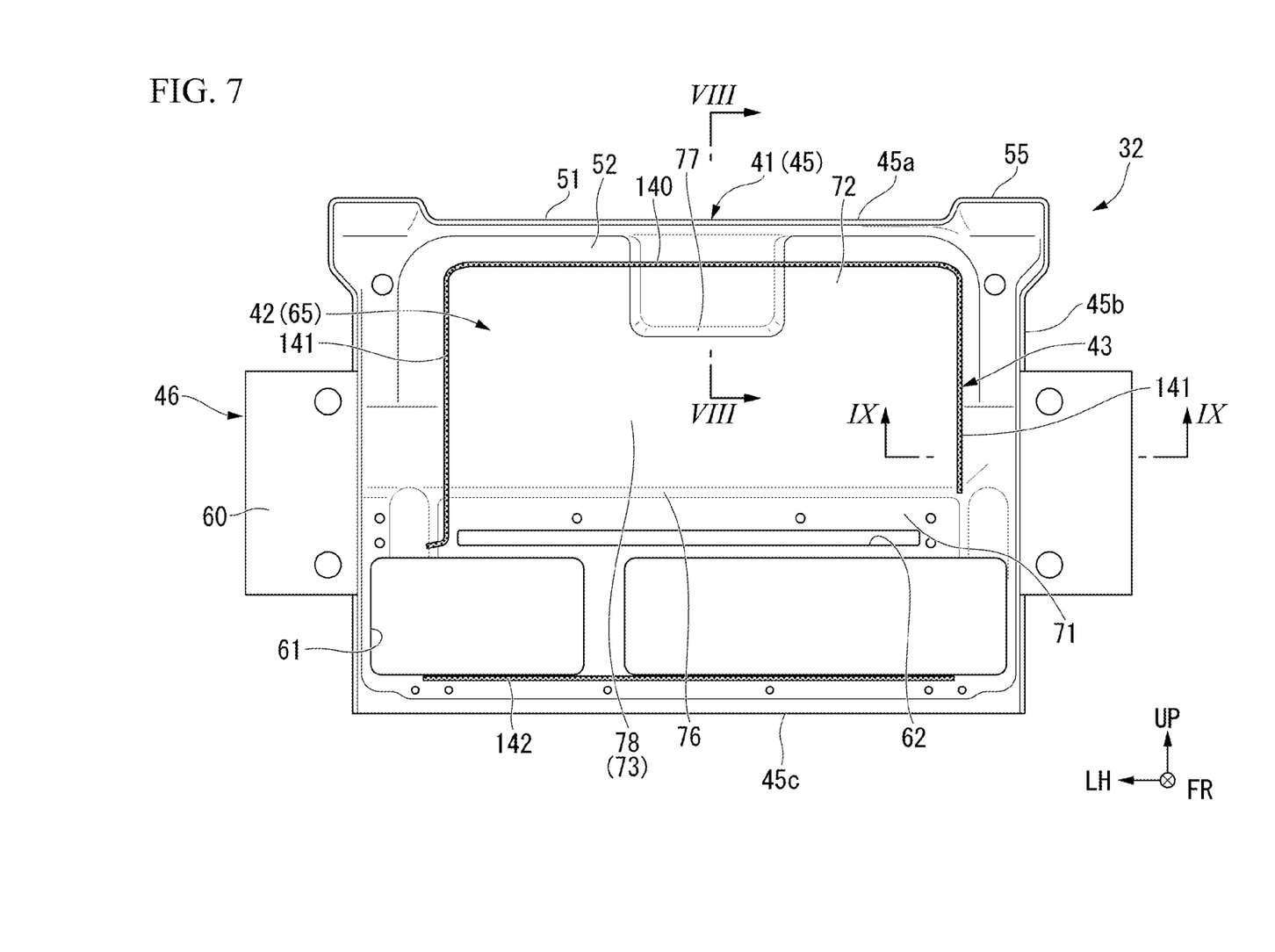
FIG. 7 is a rear view of a bulkhead according to the embodiment.

FIG. 7 is a rear view of the bulkhead 32.

Here, as shown in FIGS. 4, 5, and 7, in the bulkhead 32 of the present embodiment, the division portion 43 is formed in parts overlapping the outer circumferential edges (boundary parts between the condenser core 121 and the condenser tanks 120 or the frame members 122) of the condenser core 121 described above in a front view. The division portion 43 is formed to have a rib shape surrounding a part around the condenser core 121. Specifically, the division portion 43 includes an upper rib 140, side ribs 141, and a lower rib 142.

Figure 8:
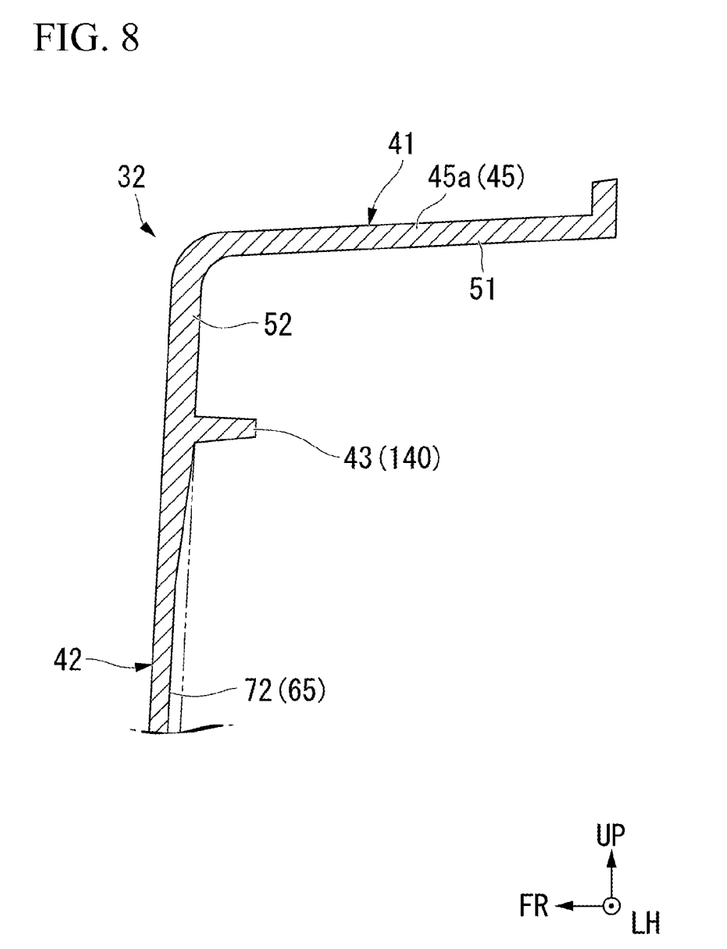
FIG. 8 is a cross-sectional view along line VIII-VIII in FIG. 7.

FIG. 8 is a cross-sectional view along line VIII-VIII in FIG. 7.

As shown in FIG. 8, the upper rib 140 protrudes rearward from the vertical wall 52 part of upper wall portion 45a and extends in the left-right direction. A tip portion (rear end portion) of the upper rib 140 is close to or abuts the outer circumferential edge of the condenser core 121 from the front.

Figure 9:
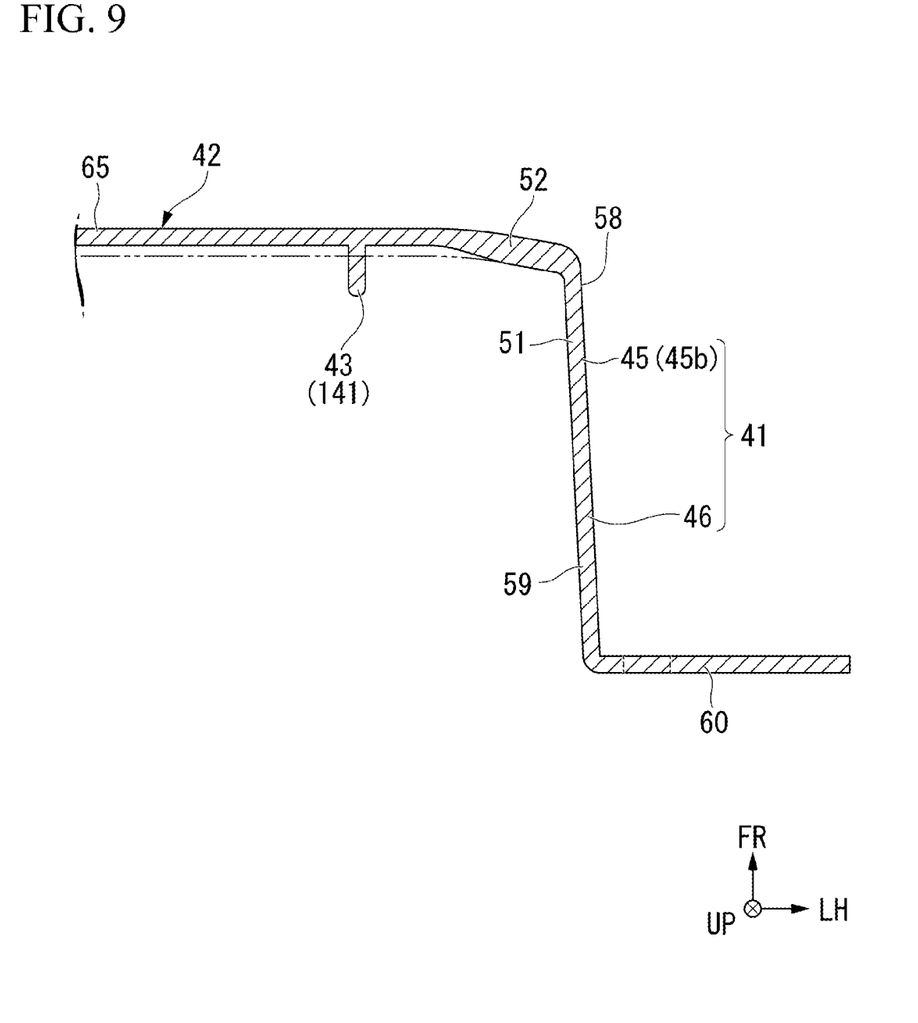
FIG. 9 is a cross-sectional view along line IX-IX in FIG. 7.

FIG. 9 is a cross-sectional view along line IX-IX in FIG. 7.

As shown in FIGS. 7 and 9, the side ribs 141 extend downward from both left and right end portions of the upper rib 140. The side ribs 141 protrude rearward from the outer circumferential edges of the duct portion 42. The tip portions (rear end portions) of the side ribs 141 are close to or abut the outer circumferential edge of the condenser core 121 from the front. The lower end edges of the side ribs 141 are terminated above the second introduction port 62. The upper rib 140 and the side ribs 141 surround at least an upper side and both sides on the left and the right of the central flow channel wall 73 described above.

As shown in FIG. 7, the lower rib 142 is formed at a part positioned below the first introduction port 61 in the vertical wall 52 part of the lower wall portion 45c. The lower rib 142 protrudes rearward from the vertical wall 52 part of the lower wall portion 45c and extends in the left-right direction. The tip portion (rear end portion) of the lower rib 142 is close to or abuts the outer circumferential edge of the condenser core 121 from the front. Each of the ribs 140 to 142 is not limited to a continuously extending configuration, and may adopt an intermittently extending configuration.

Next, operation of the front end structure 21 described above will be described. In the following description, a flow of outside air at the time when a vehicle travels will be described. In this case, it is assumed that the shutter 34 is in a fully open state and the fan motor 131 is rotating.

As shown in FIGS. 1 and 4, as the vehicle 1 travels, outside air is introduced into the bumper duct 33 through the grille 31. A portion of outside air of the outside air which has been introduced into the bumper duct 33 passes through the ventilation ports 82a (refer to FIG. 3) of the shutter 34 toward the first introduction port 61. Outside air flowing toward the first introduction port 61 is introduced into the bulkhead 32 through the first introduction port 61. A portion of outside air of the outside air which has been introduced into the bulkhead 32 is guided rearward due to a suction force of the fan motor 131, thereby passing through the condenser core 121 and the radiator core 101.

On the other hand, the remaining outside air of the outside air which has been introduced into the bulkhead 32 collides with the front surface of the condenser core 121 and then flows upward in the flow channel 64 formed between the bulkhead 32 and the condenser 92. Thereafter, during a course of flowing upward inside the flow channel 64, outside air is guided rearward due to a suction force of the fan motor 131, thereby passing through the condenser core 121 and the radiator core 101.

Here, outside air, of the outside air flowing in the flow channel 64, which has arrived at the outer circumferential edge of the condenser core 121 is blocked by the division portion 43. Outside air blocked by the division portion 43 is guided rearward due to a suction force of the fan motor 131, thereby passing through the condenser core 121 and the radiator core 101.

Outside air cools the condenser core 121 and the radiator core 101 due to heat exchange performed when it passes through the condenser core 121 or the radiator core 101. Outside air which has passed through the condenser core 121 and the radiator core 101 is discharged rearward through the air guiding hole 132 of the shroud 130.

In this manner, in the present embodiment, the bulkhead 32 is configured to include the division portion 43 which partitions the inside and the outside of the condenser core 121 or the radiator core 101.

According to this configuration, outside air flowing along the front surface of the condenser core 121 is blocked by the division portion 43. Therefore, outside air bypassing the condenser core 121 and the radiator core 101 can be curbed. That is, outside air can actively pass through the condenser core 121 and the radiator core 101. Therefore, cooling performance can be improved.

Further, in the present embodiment, the inside and the outside of the bulkhead 32 communicate with each other through only the introduction ports 61 and 62 formed at the lower end portion. Therefore, an opening portion (for example, the grille 31) on the front surface of the vehicle body 10 can be reduced. As a result, air resistance can be reduced, and the appearance can be improved. Particularly, in a case of an electrically driven vehicle as in the present embodiment, a required cooling capacity is smaller than that of a vehicle in which an internal combustion engine is mounted. For this reason, a cooling performance efficiency of the front end structure 21 is enhanced, and size reduction can be achieved. In addition, as described above, for example, mass production can be realized and weight reduction can be achieved by forming the bulkhead 32 through injection molding or heating press molding using a composite material such as polypropylene with glass fibers.

In the present embodiment, the division portion 43 is configured to protrude rearward and to extend in a rib shape following the frame portion 41.

According to this configuration, rigidity for the bulkhead 32 can be secured. In addition, a clearance between the condenser 92 and the bulkhead 32 can be restricted over a wide range. Therefore, outside air can be actively guided to the condenser core 121 and the radiator core 101.

Moreover, the bulkhead 32 is attached to the vehicle body 10 with the vehicle body attachment portion 46 extending laterally from the frame portion main body 45 therebetween. For this reason, a margin for attachment between the vehicle body 10 and the bulkhead 32 can be easily secured, and a support strength of the bulkhead 32 can also be secured.

In the present embodiment, the recessed portion 58, through which the bumper beam extension 24 passes, is configured to be formed in the frame portion 41.

According to this configuration, the recessed portion 58 is formed in only a portion of the frame portion 41. Therefore, for example, even in a vehicle type or the like having a narrow width in the left-right direction, it is possible to dispose as large the bulkhead 32 as possible. Accordingly, the heat exchange unit 22 accommodated on the inward side of the bulkhead 32 can be increased in size.

In the present embodiment, the support ribs 50 are configured to be provided at the upper and lower end edges of the vehicle body attachment portion 46. According to this configuration, rigidity for the vehicle body attachment portion 46 can be secured, and a support strength of the bulkhead 32 can be secured.

In the present embodiment, the radiator 91 is configured to come into contact with the frame portion 41 with the seal members 112 therebetween on the outward side of the division portion 43.

According to this configuration, even if outside air passes through the division portion 43, outside air bypassing the condenser core 121 and the radiator core 101 can be curbed.

In the present embodiment, the shutter 34 which opens and closes the first introduction port 61 is configured to be included.

According to this configuration, the amount of outside air flowing into the bulkhead 32 can be adjusted by adjusting the opening degree of the shutter 34. Accordingly, cooling performance of the heat exchange unit 22 can be adjusted.

Further, in the present embodiment, the shutter 34 is configured to be deformable in a manner of being bent due to a pressure of outside air at the closed position. For this reason, for example, when the vehicle 1 travels while the shutter 34 is at the closed position, the shutter frame 82 is close to or abuts an opening edge of the first introduction port 61. Accordingly, a gap between the shutter 34 and the first introduction port 61 can be sealed with a simple configuration. In this case, it is possible to curb so-called recirculation in which warm air on a downstream side (rear) flows backward to an upstream side (front). In addition, there is no need to separately provide a seal member for sealing a gap between the shutter 34 and the opening edge of the first introduction port 61. Therefore, the number of components can be reduced. Moreover, compared to a configuration in which the shutter 34 and the opening edge of the first introduction port 61 are brought into tight contact with each other, uneven assembly accuracy can be allowed. For example, it is possible to curb interference between the shutter 34 and the bulkhead 32 hindering assembly of the shutter 34, or the like.

In the present embodiment, the second introduction port 62 is configured to be formed in the duct portion 42 at a position not overlapping the shutter 34 in a front view.

According to this configuration, even when the size of the shutter 34 or the first introduction port 61 is limited due to the influence of surrounding members (for example, the bumper beam 25) of the shutter 34, outside air can be taken into the bulkhead 32 through the second introduction port 62.

In the present embodiment, a part of the duct portion 42 joined to the bumper duct 33 is configured to be formed to have a thicker wall than other parts.

According to this configuration, an attachment strength of the bumper duct 33 can be secured, and the bulkhead 32 can be reduced in weight.

In the present embodiment, the lower wall portion 45c of the frame portion 41 is configured to include the lateral wall 51, the vertical wall 52, and the reinforcement rib 57, and the protruding amount of the reinforcement rib 57 is configured to increase toward the rear.

According to this configuration, rigidity for the lateral wall 51 can be secured due to the reinforcement rib 57. Therefore, the volume inside the bulkhead 32 can be secured, and an accommodation member (for example, the heat exchange unit 22) accommodated inside the bulkhead 32 can be stably supported by the lateral wall 51. Particularly, the protruding amount of the reinforcement rib 57 increases at the rear end portion of the lateral wall 51 in which a bending moment is likely to increase. Therefore, rigidity necessary for the lateral wall 51 can be secured.

On the other hand, a connection member (for example, the shutter 34) connected to the front of the bulkhead 32 is support by the vertical wall 52. Therefore, a small protruding amount of the reinforcement rib 57 at the front end portion of the lateral wall 51 can be maintained.

In this manner, rigidity for the frame portion 41 can be secured, and the bulkhead 32 can be reduced in weight by adjusting the protruding amount of the reinforcement rib 57 in accordance with a necessary place.

In the present embodiment, the bulging portions 55 accommodating the radiator brackets 110 are configured to be formed in the frame portion 41, and the radiator brackets 110 are configured to be fixed to the bulging portions 55 in the front-rear direction.

According to this configuration, only a portion of the frame portion 41 is caused to bulge. Therefore, reduction in size or weight of the bulkhead 32 can be achieved, and the radiator 91 or the condenser 92 can be settled on the inward side of the bulkhead 32.

In the present embodiment, the lower tapered portion 76 is configured to be formed at a part positioned below the straight portion 78 in the flow channel wall 65.

According to this configuration, a cross-sectional area of the flow channel 64 increases during a course from the lower tapered portion 76 to the straight portion 78. Therefore, compared to when the cross-sectional area of the flow channel is uniformly formed, vortices easily occur in outside air. Accordingly, a vector of outside air flowing upward is reduced, and thus outside air easily flows rearward.

On the other hand, the cross-sectional area of the flow channel 64 is reduced during a course from the straight portion 78 to the upper tapered portion 77. Therefore, compared to when the cross-sectional area of the flow channel is uniformly formed, it is difficult for outside air to flow upward. Accordingly, outside air easily flows rearward.

As a result, the cooling performance can be improved.

Other Modification Examples

Hereinabove, preferable examples of the present invention have been described, but the present invention is not limited to these examples. Additions, omissions, substitutions, and other modifications of the configurations can be made within a range not departing from the gist of the present invention. The present invention is not limited to the foregoing description and is limited by only the appended claims.

For example, in the embodiment described above, a case in which the frame portion 41 and the duct portion 42 are integrally formed has been described. However, the embodiment is not limited to this configuration. The frame portion 41 and the duct portion 42 may be formed as separate bodies.

In the embodiment described above, a configuration in which the introduction ports 61 and 62 are formed at the lower end portion (first end portion in the up-down direction) of the duct portion 42 has been described. However, the embodiment is not limited to this configuration. The introduction ports 61 and 62 may be formed at the upper end portion (second end portion in the up-down direction) of the duct portion 42.

In the embodiment described above, a configuration in which the vehicle body attachment portion 46 extends from the side wall portion 45b has been described. However, the embodiment is not limited to this configuration. The bulkhead 32 may be attached to the vehicle body 10 (skeleton member 20) by various methods.

In the embodiment described above, a configuration having the recessed portion 58, through which the bumper beam extension 24 passes, has been described. However, the embodiment is not limited to this configuration.

In the embodiment described above, a case in which the front end structure 21 according to the present invention is mounted in an electrically driven vehicle has been described. However, the embodiment is not limited to this configuration. The front end structure 21 can be mounted in various vehicles.

In the embodiment described above, a configuration in which the division portion 43 is formed to have a rib shape following the frame portion 41 has been described. However, the embodiment is not limited to this configuration. The shape or the like of the division portion 43 can be suitably changed. In this case, the division portion 43 extends in the up-down direction. Therefore, outside air is easily guided in the up-down direction along the front surface of the condenser core 121. On the other hand, the division portion 43 extends in the left-right direction. Therefore, the flow of outside air in the up-down direction can be suitably restricted.

In addition, the division portion 43 need only be formed in at least any of the frame portion 41 and the duct portion 42.

In the embodiment described above, a configuration in which the radiator 91 and the frame portion 41 come into tight contact with each other with the seal members 112 therebetween has been described. However, the embodiment is not limited to this configuration. For example, the condenser 92 and the frame portion 41 or the duct portion 42 may come into tight contact with each other with a seal member therebetween.

Furthermore, the constituent elements of the embodiment described above can be suitably replaced with known constituent elements within a range not departing from the gist of the present invention. In addition, the modification examples described above may be suitably combined.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Vehicle body
21 Front end structure
24 Bumper beam extension
33 Bumper duct (second duct portion)
34 Shutter
41 Frame portion
42 Duct portion (first duct portion)
43 Division portion
45b Side wall portion
46 Vehicle body attachment portion
50 Support rib
51 Lateral wall
52 Vertical wall
55 Bulging portion
57 Reinforcement rib
58 Recessed portion
61 First introduction port
62 Second introduction port
76 Lower tapered portion (reduced portion)
77 Upper tapered portion (reduced portion)
78 Straight portion (expanded portion)
91 Radiator (heat exchanger)
92 Condenser (heat exchanger)
100 Radiator tank (support area)
101 Radiator core (heat exchange area)
102 Frame member (support area)
110 Radiator bracket (fixing portion)
112 Seal member
120 Condenser tank (support area)
121 Condenser core (heat exchange area)
122 Frame member (support area)

What is claimed is:

1. A front end structure comprising:
a frame portion that surrounds an outer circumferential part of a heat exchanger disposed in the front of a vehicle body and supports the heat exchanger;
a first duct portion that is connected to an inner circumferential edge of the frame portion and guides outside air, which is taken in through a first introduction port opening at a first end portion in an up-down direction, in at least the up-down direction through a space between the first duct portion and a front surface of the heat exchanger;
a division portion that is provided in at least one of the frame portion and the first duct portion and partitions the heat exchanger into a heat exchange area in which outside air is able to pass through in a front-rear direction and a support area which is positioned on a side circumferentially outward from the heat exchange area and is supported by the frame portion; and
a shutter that is disposed in front of the first introduction port with a gap therebetween and is configured to open and close the first introduction port,
wherein the shutter is configured to be deformable in a manner of being bent rearward due to a pressure of outside air at a closed position.

2. The front end structure according to claim 1,
wherein the frame portion includes
a side wall portion which is positioned on a lateral side of the heat exchanger, and a vehicle body attachment portion which extends laterally from the side wall portion and is attached to the vehicle body, and wherein the division portion protrudes rearward and extends in a rib shape following the frame portion.

3. The front end structure according to claim 2, wherein a bumper beam extension connected to the vehicle body attachment portion is provided on a lateral side of the side wall portion, and wherein a recessed portion through which a portion of the bumper beam extension passes in the front-rear direction is formed in a part of the side wall portion facing the bumper beam extension in a vehicle width direction.

4. The front end structure according to claim 2, wherein a support rib is formed at an outer circumferential edge of the vehicle body attachment portion.

5. The front end structure according to claim 1, wherein the heat exchanger is at least any of a condenser and a radiator, and wherein the frame portion comes into contact with the heat exchanger with a seal member therebetween on the side circumferentially outward from the division portion.

6. The front end structure according to claim 1, wherein a second introduction port for taking outside air into the first duct portion is formed in the first duct portion at a position not overlapping the shutter in a front view.

7. The front end structure according to claim 6, wherein a second duct portion for guiding outside air into the first introduction port and the second introduction port is disposed in front of the first duct portion, and wherein a part of the first duct portion joined to the second duct portion is formed to have a thicker wall than other parts.

8. The front end structure according to claim 7, wherein the frame portion includes
- a lateral wall which is positioned below the heat exchanger,
- a vertical wall which extends upward from a front end portion of the lateral wall and supports the shutter from below, and
- a reinforcement rib which protrudes downward from the lateral wall, and wherein a protruding amount of the reinforcement rib from the lateral wall increases from the front toward the rear.

9. The front end structure according to claim 1, wherein a bulging portion which bulges beyond other parts and accommodates a fixing portion of the heat exchanger provided in the support area is formed in a portion of the outer circumferential part in the frame portion, and wherein the fixing portion is fixed to the bulging portion in the front-rear direction.

10. The front end structure according to claim 1, wherein the first duct portion includes
- an expanded portion which overlaps the center of the heat exchange area in a front view, and
- reduced portions which are positioned above and below the expanded portion and of which a cross-sectional area of a flow channel orthogonal to the up-down direction is smaller than a cross-sectional area of the expanded portion.

* * * * *